(12) United States Patent
Li et al.

(10) Patent No.: US 7,983,352 B2
(45) Date of Patent: Jul. 19, 2011

(54) POWER ALLOCATION IN A MIMO SYSTEM WITHOUT CHANNEL STATE INFORMATION FEEDBACK

(75) Inventors: Ye Li, Marietta, GA (US); Anthony C. K. Soong, Plano, TX (US); Jianmin Lu, San Diego, CA (US)

(73) Assignee: FutureWei Technologies, Inc., Plano, TX (US)

( * ) Notice: Subject to any disclaimer, the term of this patent is extended or adjusted under 35 U.S.C. 154(b) by 1286 days.

(21) Appl. No.: 11/532,490

(22) Filed: Sep. 15, 2006

(65) Prior Publication Data
US 2008/0070542 A1 Mar. 20, 2008

(51) Int. Cl.
*H04L 1/02* (2006.01)
(52) U.S. Cl. ........ 375/267; 370/319; 370/344; 370/334; 455/67.11; 455/504
(58) Field of Classification Search .................. 370/344, 370/334, 319; 375/267; 455/67.11, 504
See application file for complete search history.

(56) References Cited

U.S. PATENT DOCUMENTS

| | | | |
|---|---|---|---|
| 2005/0084028 A1* | 4/2005 | Yu et al. ...................... | 375/267 |
| 2005/0084208 A1 | 4/2005 | Kim et al. | |
| 2005/0276347 A1* | 12/2005 | Mujtaba et al. ............... | 375/299 |
| 2006/0029144 A1 | 2/2006 | Dabak et al. | |
| 2006/0039489 A1 | 2/2006 | Ikram et al. | |
| 2006/0067428 A1* | 3/2006 | Poon ............................ | 375/299 |
| 2006/0167964 A1 | 7/2006 | Balakrishnan et al. | |
| 2006/0171488 A1 | 8/2006 | Rosenlof et al. | |

FOREIGN PATENT DOCUMENTS

| | | |
|---|---|---|
| CN | 1829138 A | 9/2006 |
| EP | 1396956 * | 10/2004 |
| WO | WO 2006/039641 A2 | 4/2006 |

OTHER PUBLICATIONS

WO2006039614, Intel Published Apr. 13, 2006.*
"Adaptve M-QAM modulation for MIMO Systems" Ramkumar Gowrishankar, Apr. 2005 IEEE.*
Duel-Hallen, Alexandra, "Decorrelating Decision-Feedback Multiuser Detector for Synchronous Code-Division Multiple-Access Channel", IEEE Transactions on Communications, vol. 41, No. 2, pp. 285-290, Feb. 1993.
Foschini, G.J., et al., "On Limits of Wireless Communications in a Fading Environment when Using Multiple Antennas", Wireless Personal Communications 6:, pp. 311-335, 1998.
Telatar, Emre, "Capacity of Multi-antenna Gaussian Channels", European Transactions on Telecommunications, vol. 10, No. 6, 28 pgs., Nov./Dec. 1999.

(Continued)

*Primary Examiner* — Ajit Patel
*Assistant Examiner* — Michael Irace
(74) *Attorney, Agent, or Firm* — Slater & Matsil, L.L.P.

(57) ABSTRACT

A telecommunication network component, comprising: a memory configured to store instructions, and a processor configured to execute the stored instructions, the instructions comprising: determining a plurality of power allocation adjustments for signals transmitted via an antenna array that promotes decision-feedback detection without using channel state information, and outputting the power allocation adjustments to the array. Also disclosed is a power allocation method comprising: determining a power allocation scheme that promotes decision-feedback detection in a multiple-input and multiple-output system without using channel state information, and implementing the power allocation scheme on an antenna array by modifying an adjustment for each of a plurality of antennas in the array.

16 Claims, 10 Drawing Sheets

OTHER PUBLICATIONS

Bhashyam, Srikrishna, et al., "Feedback Gain in Multiple Antenna Systems", IEEE Transactions on Communications, vol. 50, No. 5, pp. 785-798, May 2002.

Li, Ye (Geoffrey), et al., "MIMO-OFDM for Wireless Communications: Signal Detection with Enhanced Channel Estimation", IEEE Transactions on Communications, vol. 50, No. 9, pp. 1471-1477, Sep. 2002.

Santipach, Wiroonsak, et al., "Benefits of Limited Feedback for Wireless Channels", www.ece.northwestern.edu, 2003 Allerton Conference, 10 pgs., 2003.

Love, David J., et al., "Limited Feedback Precoding for Spatial Multiplexing Systems", University of Texas, Globecom 2003, pp. 1857-1861; 2003.

Lau, Vincent, et al., "On the Design of MIMO Block-Fading Channels with Feedback-Link Capacity Constraint", IEEE Transactions on Communications, vol. 52, No. 1, pp. 62-70, Jan. 2004.

Choi, Jihoon, et al., "Interpolation Based Transmit Beamforming for MIMO-OFDM with Limited Feedback", IEEE Transactions on Signal Processing, vol. 53, No. 11, pp. 4125-4135, Nov. 2005.

Du, Jianxuan, et al., "Layered Space-Time Structure with Statistical Rate Allocation", IEEE, pp. 563-567, 2005.

Zhang, Hua, et al., "A Reduced CSI Feedback Approach for Precoded MIMO-OFDM Systems", IEEE Transactions on Wireless Communications, vol. 6, No. 1, pp. 55-58, Jan. 2007.

PCT International Search Report and PCT Written Opinion of the International Searching Authority for PCT/CN2007/070699, forms PCT/ISA/220, PCT/ISA/210 and PCT/ISA/237, mailed Dec. 27, 2007, Applicant: Huawei Technologies Co., Ltd., et al., 6 pages.

\* cited by examiner

POWER ALLOCATION IN A MIMO SYSTEM WITHOUT CHANNEL STATE INFORMATION FEEDBACK

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Transmit and receive antenna arrays can be used to form multiple-input and multiple-output (MIMO) systems. In a MIMO system, there are two or more antennas at a transmitter and two or more antennas at a receiver. A signal transmitted by a MIMO transmitter may be expressed as a function of data that is to be transmitted and channel state information (CSI). The CSI is a mathematical representation of a signal channel, namely the way in which a signal traverses a communication medium from a sender to a receiver. Therefore, in a MIMO system the CSI represents how each transmitted signal traverses a communication medium from each antenna at the transmitter to each of the antennas at one or more receivers. The CSI of a MIMO system can be exploited at the transmitter in many different ways to improve the performance of a MIMO system. For example, the performance may be improved in the form of increased reliability and capacity of data transmission, especially in comparison with single-input systems.

In many situations, however, the transmitter can only obtain CSI through feedback from the receiver, which usually requires large overhead. The large overhead is caused by processing power being used at the receiver to estimate the CSI and bandwidth being used by the receiver to communicate the CSI back to the transmitter. Further, due to various problems such as channel estimation error and delay in the feedback, the CSI available at the transmitter is imperfect. The imperfect CSI may lead to reduced performance gains of a MIMO system. As such, it is desirable to utilize a MIMO system to improve performance without using CSI. In particular, it is desirable to determine an optimal power allocation of the transmitted signals without CSI based on the signal-to-noise ratio of the layered space-time MIMO system, because such power allocation facilitates decision feedback detection and successive interference cancellation.

SUMMARY

In one aspect, the invention includes a telecommunication network component, comprising: a memory configured to store instructions, and a processor configured to execute the stored instructions, the instructions comprising: determining a plurality of power allocation adjustments for signals transmitted via an antenna array that promotes decision-feedback detection without using channel state information, and outputting the power allocation adjustments to the array.

In another aspect, the invention includes a power allocation method comprising: determining a power allocation scheme that promotes decision-feedback detection in a multiple-input and multiple-output system without using channel state information, and implementing the power allocation scheme on an antenna array by modifying an adjustment for each of a plurality of antennas in the array.

In a third aspect, the invention includes a system for communicating modulated signals comprising: an array of antennas configured to transmit modulated signals, at least one adjustment unit configured to adjust power allocated to the antennas, and a calculation unit configured to calculate at least one adjustment for the adjustment unit to improve decision-feedback detection at an array of receivers without using channel state information.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

It should be understood at the outset that although an illustrative implementation of one embodiment of the present disclosure is illustrated below, the present system may be implemented using any number of techniques, whether currently known or in existence. The present disclosure should in no way be limited to the illustrative implementations, drawings, and techniques illustrated below, including the exemplary design and implementation illustrated and described herein, but may be modified within the scope of the appended claims along with their full scope of equivalents.

Disclose herein is a system and method for improving multiple-input and multiple-output (MIMO) system performance using the signal-to-noise ratio (SNR) and/or bit-error rate (BER), but without using channel state information (CSI). This improved performance is gained through determining an optimal power allocation of the transmitted signals based on the SNR of the MIMO system. The power is allocated such that decision feedback (DF) detection is improved or promoted by allocating more power to the first signals. By allocating power in this way, the BER for a given signal-to-noise ratio is decreased compared to when power is allocated uniformly for all of the signals. The system and method disclosed above may also be used even if the SNR is not available at the transmitter. When the SNR is not available, the power allocation is performed based on a required BER of the MIMO system. In this case, the performance is still improved when compared to uniform power allocation, but the improvement may be less than when the SNR is known. Also, error correcting code may be used at the receiver to further increase the performance gains.

Figure 1:
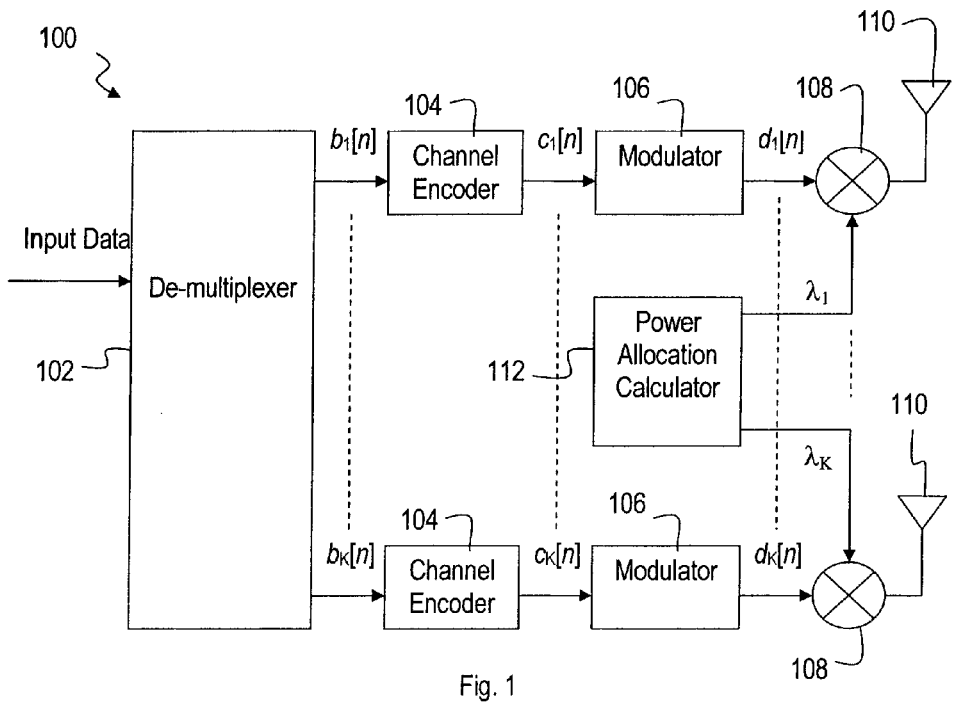
FIG. 1 shows an illustrative transmitter of a MIMO system.

FIG. 1 illustrates one embodiment of a transmitter 100 associated with a MIMO communications system. The transmitter 100 contains a de-multiplexer 102, and a plurality of channel encoders 104, modulators 106, adjustors 108, and antennas 110. The transmitter 100 may be configured with a layered structure such that the channel encoders 104, modulators 106, adjustors 108, and antennas 110 are arranged in a parallel configuration, as illustrated by the embodiment shown in FIG. 1. As explained in further detail below, the transmitter 100 also contains at least one power allocation calculator 112 that is used to modify the strength of the signals transmitted over the antennas 110 to facilitate improved DF detection.

Data generally flows from left to right through the transmitter 100. The transmitter 100 may receive input data from a telecommunications or data network (not shown) in the form of a single communications signal or a multiplexed communications signal. If the input data is multiplexed, the de-multiplexer 102 separates the input data into a plurality of sub-streams, $b_k[n]$. As used herein, the use of a lower-case "k" refers to a general designation of a data stream, whereas the use of a number, such as 1 or 2, or a capital "K" refers to a specific designation of a data stream. Thus, the sub-streams may be generally referred to as $b_k[n]$, or specifically referred to as $b_1[n]$, $b_2[n]$, $b_3[n]$, or $b_K[n]$. Returning to FIG. 1, the sub-streams are fed into the channel encoders 104 that encode the sub-streams using error-correction codes to produce symbols, $c_k[n]$. If desired, the error-correction codes may be interleaved to reduce the quantity of undetected error bursts. The symbols produced by the channel encoders 104 are fed into the modulators 106 that modulate the symbols into signals, $d_k[n]$. The signals are then fed into the adjustors 108 that modify the power allocated to the signals by an adjustment factor, $\lambda_k$, produced by the power allocation calculator 112. After the signals are modified in the adjustors 108, the modified signals are transmitted by the antennas 110. In the embodiment illustrated in FIG. 1, the transmitter 100 has K antennas 110. The power allocation of the modified signals reduces the probability of symbol detection errors. In one embodiment, the transmitter 100 may implement orthogonal frequency division multiplexing (OFDM) to convert a frequency-selective broadband channel into a plurality of narrowband channels. In such an embodiment, the channels may be flat fading. Fading refers to the variation of a transmitted signal caused by changes in the communication medium, wherein flat fading indicates that fading occurs proportionally for all frequency components of a received signal.

The power allocation calculator 112 creates adjustment factors, $\lambda_k$, that are used to modify the power allocated to the signals. While the power allocation calculator 112 may produce an adjustment factor for each signal stream in the transmitter 100, it is also contemplated that the power allocation calculator 112 may produce adjustment factors for less than all of the signal streams. Such an embodiment is advantageous because it may reduce the quantity of computations performed by the power allocation calculator 112, for example, by only producing adjustment factors for the signal streams that require adjustment. In an embodiment, the power allocation calculator 112 may assume that the energy of each signal stream may be zero. Specifically, for any n or k:

$$E\{d_k[n]\}=0 \tag{1}$$

Similarly, the power allocation calculator 112 may assume that the average power of each signal stream may be a unit value. Specifically, for any n or k:

$$E\{|d_k[n]|^2\}=1 \tag{2}$$

Such assumptions maintain the generality of the signal streams by keeping the transmission of all of the signal streams between 0 (no power) and 1 (maximum power).

Figure 2:
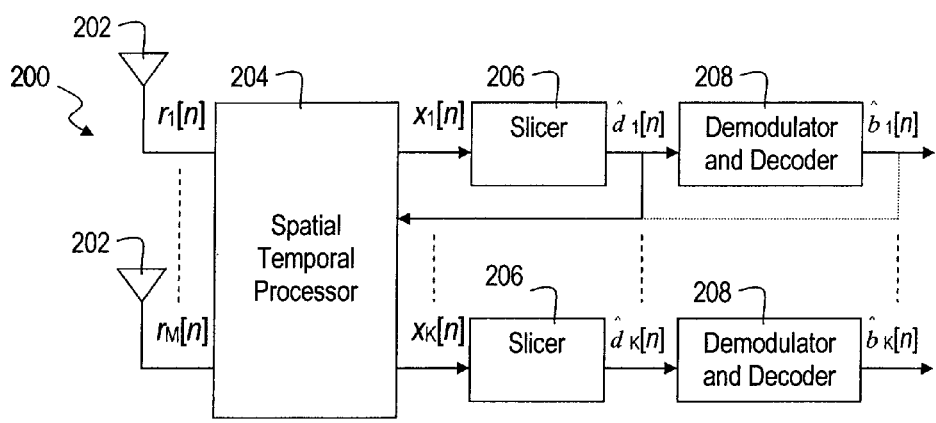
FIG. 2 shows an illustrative receiver of a MIMO system.

FIG. 2 illustrates an embodiment of a receiver of a MIMO wireless communications system. The receiver 200 contains a spatial temporal processor 204, and a plurality of antennas 202, slicers 206, and demodulators and decoders 208. The receiver 200 may be configured in a layered structure such that the slicers 206 and the demodulators and decoders 208 are arranged in a parallel configuration, as illustrated by the embodiment shown in FIG. 2. As explained in further detail below, the receiver 200 is used to perform DF detection on the received signals to detect the symbols transmitted by the transmitter 100.

Data generally flows from left to right through the receiver 200. The receiver 200 receives the signals $r_k[n]$ through antennas 202. In the embodiment illustrated in FIG. 2, the receiver 200 has M antennas 202. It is contemplated that the number of antennas 202 on the receiver 200 may be more than, less than, or equal to the number of antennas 110 on the transmitter 100. That is, K may be greater than M, K may be less than M, or K may be equal to M. The signals received through the antennas 202 are input to the spatial temporal processor 204 that manipulates the received signals to obtain decision statistics $x_k[n]$. The decision statistics are a statistical estimation of the transmitted signal based on a portion of the signals received at all of the antennas 202. For example, the decision statistic for the first antenna 110, $x_1[n]$, is an estimation of the cumulative effect that the transmitted signal $d_1[n]$ had on each of the antennas 202. The spatial temporal processor 204 suppresses the interference caused by the other signals received at each of the antennas 202 using MMSE criteria discussed in more detail below. The decision statistics are input to a slicer 206 that performs quantisation of the decision statistics to calculate a decision $\hat{d}_k[n]$ of the received signal $d_k[n]$. Once a decision is made, the decision may be fed back to the spatial temporal processor 204 in order to perform decision feedback detection described in more detail below. The decision $\hat{d}_k[n]$ may also be input to a demodulator and decoder 208 to demodulate and decode the decision into decoded words $\hat{b}_k[n]$. The decoded words may then be used by any equipment (not shown) connected to the receiver 200 such as a cellular phone or a laptop. In an alternative embodiment, rather that feeding back the decision to the spatial temporal processor 204, the decoded words may be fed back to the spatial temporal processor 204. By feeding back the decoded words to the spatial temporal processor 204, error correcting code may be used to perform successive interference cancellation described in more detail below.

When transmitting a signal from a transmitter to a receiver, the signal traverses a communication medium. The path that the signal travels over the communication medium is referred to as the channel, where the impact that the communication medium has on the signal is referred to as the channel gain. The channel gain corresponding to the k-th transmitter antenna and the m-th receiver antenna is denoted as $h_{km}$. For example, the channel gain $h_{11}$ denotes the impact applied by the communication medium for a signal traveling from the first transmitter antenna to the first receiver antenna. A channel vector for the k-th transmitter antenna, $h_k$, indicates each of the channel gains from the k-th transmitter antennas to each of the receiver antennas. A channel matrix, H, indicates the channel vector for each of the transmitter antennas. The channel vector for the k-th transmitter antenna and the channel matrix may be expressed as:

$$h_k = \begin{pmatrix} h_{k1} \\ \vdots \\ h_{kM} \end{pmatrix} \text{ and } H = (h_1, \ldots, h_K) \qquad (3)$$

respectively. The signal received at each of the receiver antennas 202 is the received signal vector r[n]. In accordance with equation (3), the received signal vector may be expressed as:

$$r[n] = \begin{pmatrix} r_1[n] \\ \vdots \\ r_M[n] \end{pmatrix} = \sum_{k=1}^{K} h_k \lambda_k d_k[n] + n[n]' \qquad (4)$$

where $$n[n] = (n_1[n], \ldots, n_M[n])^T \qquad (5)$$

is the noise vector. The noise vector represents the noise detected by each of the antennas 202, where $n_1[n]$ is the noise detected by the first receiver antenna 202 and $n_M[n]$ is the noise detected by the M-th receiver antenna 202. Each $n_m[n]$'s for different m's or n's is assumed to be an independent, complex Gaussian function with zero mean and variance $\sigma_n^2$ determined by the SNR of the MIMO system. The received signal vector of equation (4) may also be expressed in matrix form as:

$$r[n] = H\Lambda d[n] + n[n] \qquad (6)$$

where $$\Lambda = \text{diag}\{\lambda_1, \ldots, \lambda_K\}. \qquad (7)$$

Figure 3:
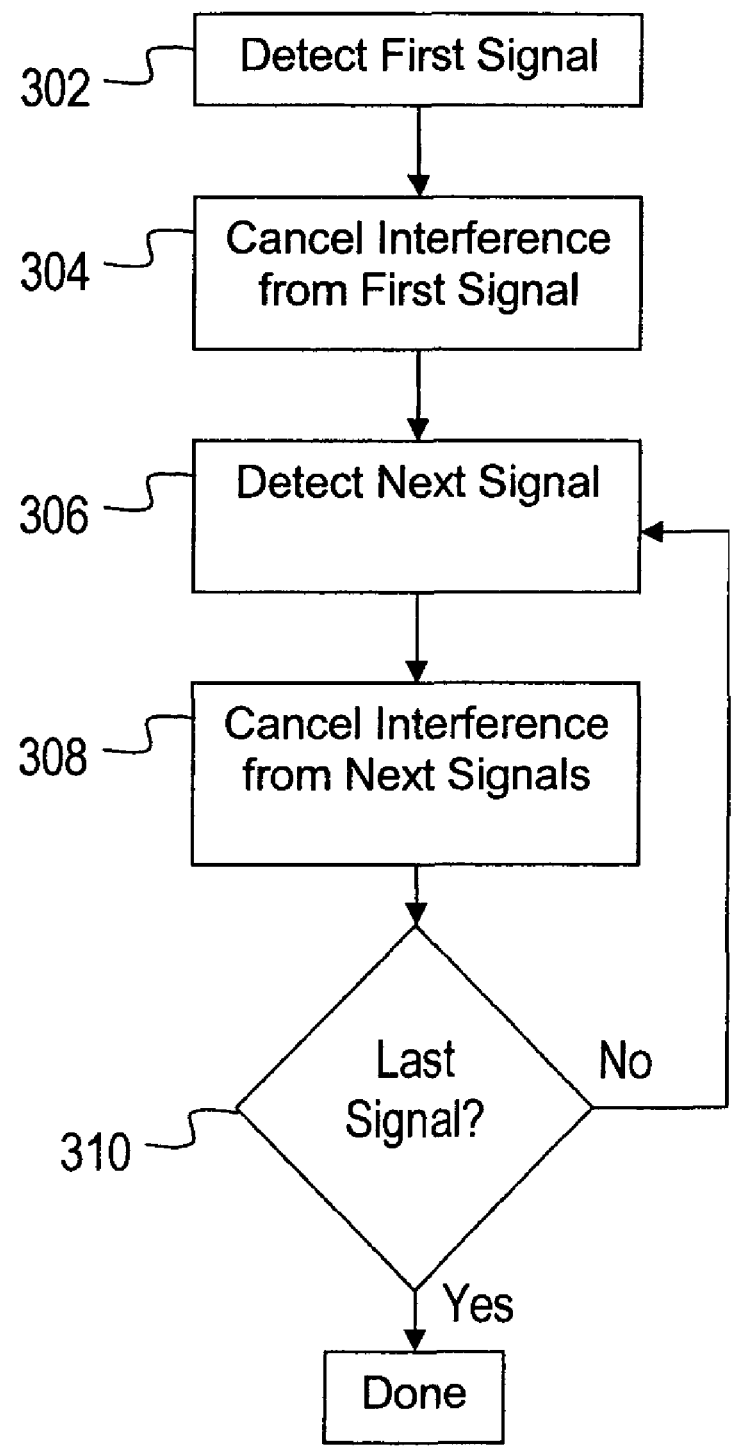
FIG. 3 shows an illustrative decision-feedback detection process.

At the receiver, the transmitted signals may be detected using a MMSE decision feedback detection process illustrated in FIG. 3. At block 302, the first symbol, $d_1[n]$, is detected. When detecting the first symbol there is multiple antenna interference from all of the other symbols being transmitted, $d_2[n], \ldots, d_K[n]$. In order for the spatial temporal processor 204 to determine the decision statistics for the first symbol, $x_1[n]$, the interference from all of the other signals needs to be suppressed. In order to accomplish the interference suppression, the spatial temporal processor may apply a nulling vector, $w_1^H$, to the received signal vector as shown below in equation (8). The nulling vector may be expressed as shown in equation (9) below. The first term of the nulling vector is the MMSE criterion used to suppress the interference and the second term is the channel vector of the first signal. In accordance with the description above, the decision statistics for the first signal, $x_1[n]$, may be expressed as:

$$x_1[n] = w_1^H r[n], \qquad (8)$$

where the nulling vector may be expressed as:

$$w_1 = (H\Lambda H^H + \sigma_n^2 I)^{-1} h_1. \qquad (9)$$

In block 304, once a decision of the first signal is made the impact of the first signal can be cancelled from the received signal vector by:

$$r_2[n] = \qquad (10)$$

$$r[n] - h_1 \lambda_1 \hat{d}_1[n] = \sum_{k=2}^{K} h_k \lambda_k d_k[n] + h_1 \lambda_1 (d_1[n] - \hat{d}_1[n]) + n[n].$$

The spatial temporal processor 204 may cancel out the impact of the first signal in accordance with equation (10) once the decision for the first signal is fed back as shown in FIG. 2. From (10), it can be seen that the impact of the first signal can be completely eliminated if the decision of the first signal is equal to the value of the first signal, $\hat{d}_1[k] = d_1[k]$. In that case, only the interference from the signals $d_3[n], \ldots, d_K[n]$ needs to be dealt with when detecting the second signal $d_2[n]$. Since there is less interference than when the first signal was detected, it is easier to detect the second signal. If the decision of the first signal does not equal the first signal, then the difference between the two signals represents the remainder of the first signal that still impacts the remainder received signal vector. This remainder may be thought of as additional noise that needs to be suppressed when detecting the next signal. In block 306 the next signal is detected, namely the second signal. Similarly, to the process described above, the decision statistics for the second signal can be obtained by $$x_2[n] = w_2^H r_2[n], \qquad (11)$$

where $$w_2 = (H_2 \Lambda_2 H_2^H + \sigma_n^2 I)^{-1} h_2, \qquad (12)$$

with $$H_2 = (h_2, \ldots, h_K)$$

and $$\Lambda_2 = \text{diag}\{\lambda_2, \ldots, \lambda_K\}. \qquad (13)$$

In each of the equations above, the values associated with the first signal are not included. This is because the impact of the first signal has been canceled out as was described above with equation (10). Similar to block 304 above, in block 308 the interference from the next signal is canceled out from the remainder of the received signal vector in order to enable easier detection of the next signal. In this case the second signal that has just been detected is canceled out from the remainder of the signal vector $r_2[n]$ to produce a remainder of the signal vector $r_3[n]$ from which a third signal may be detected. In block 310 it is determined whether all of the signals have been detected. If not, then the process repeats at block 306 to detect the next signal. If all of the signals have been detected then the DF detection process is completed.

In general, in order to detect a k-th signal then $\hat{d}_k[n]$ is the decision of the k-th signal and $d_k[n]$ is the k-th signal. The remainder of the signal vector from which the k-th signal is to be detected may be expressed as:

$$r_k[n] = \quad (14)$$

$$r[n] - \sum_{i=1}^{k-1} h_i \lambda_i \hat{d}_i[n] = \sum_{i=k}^{K} h_i \lambda_i d_i[n] + \sum_{i=1}^{k-1} h_i \lambda_i (d_i[n] - \hat{d}_i[n]) + n[n]$$

As shown in equation (14) the first term is the remainder of the signal vector from which the k-th signal is to be detected. The middle term in equation (14) is the cumulative impact remaining from previously detected signals due to the decisions of the previously detected signals not equaling the previous signals. The last term in equation (14) is the noise vector as described above. Similar to the description above, the decision statistics for the k-th signal can be determined by the spatial temporal processor 204 for as:

$$x_k[n] = w_k^H r_k[n], \quad (15)$$

where $$w_k = (H_k \Lambda_k H_k^H + \sigma_n^2 I)^{-1} h_k, \quad (16)$$

with $$H_k = (h_k, \ldots, h_K)$$

and $$\Lambda_k = \text{diag}\{\lambda_k, \ldots, \lambda_K\}.$$

As described above, in each of these equations the values associated with the previously detected signals are not included. This is because the impact of the previously detected signals has been canceled out as was described above with equation (14).

From the discussion above of the DF procedure, if all past decisions are correct, then the decision for a current signal is easier than for the past signals since the detection needs to deal with the interference from fewer symbols. However, if one or more of the past decisions are with error, then the error will be passed to the decision of the current or future symbols. Since the first detected symbols have more impact on the overall system performance more power should be allocated to those first signals.

More power should be allocated to the first signals because the first signals have more noise and interference to contend with. The SNR of a signal is determinant of the BER in detecting the signal. A signal with a high SNR may have a low BER, whereas a signal with a low SNR may have a high BER. Since the first signals have more noise then the SNR of the first signals will be lower than the SNR of each subsequent signal. Namely, when detecting the first signal, the interference from all of the other signals may be thought of as noise. When detecting the second signal, the impact of the first signal is canceled out and as such there is less noise when detecting the second and subsequent signals. As such, in order to have a high SNR for the first signals, and consequently a low BER in detecting the first signals, then more power may be allocated to the first signals. The increased amount of power allocated to the signals increases their signal strength and consequently increases their SNR such that the first signals may be detected with low BERs. As such, disclosed herein below are embodiments to optimally allocate power to different signals according to the SNR of the system rather than using the instantaneous CSI.

In one embodiment, a method may be used to determine the optimal power allocation based on a known SNR for a channel. The overall transmission power for the transmitter 100 that may be used by all of the antennas 110 is assumed to be fixed or the average power from each antenna is unit, which can be expressed as:

$$\frac{1}{K} \sum_{k=1}^{K} E\{|\lambda_k d_k[n]|^2\} = 1. \quad (17)$$

Since it has been assumed in (2) that the average power of each signal is unit, $E\{|d_k[n]|^2\} = 1$, then the constraint of equation (17) is equivalent to $$\frac{1}{K} \sum_{k=1}^{K} \lambda_k^2 = 1 \quad (18)$$

As discussed above, the SNR, g, of a MIMO system is determinant of the BER of the MIMO system. Further, since the amount of power being allocated to each signal is based on the adjustment factors $\lambda$ as shown in the transmitter 100 of FIG. 1, then the SNR is also based on the adjustment factors $\lambda$. Conversely, these relations may be expressed as the BER of a MIMO system is based on the SNR, $\gamma$, and the adjustment factors $\lambda$. This relation of the BER may be expressed as:

$$P_b = g(\gamma; \lambda_1, \ldots, \lambda_K). \quad (19)$$

As such, it is desirable to find $\lambda_k$'s that minimize the BER for any given SNR. The optimum power allocation for a MIMO system with K transmit antennas 110 and a SNR=$\gamma$ may be denoted as $\lambda_1(\gamma, k), \ldots, \lambda_k(\gamma, k)$.

Figure 4:
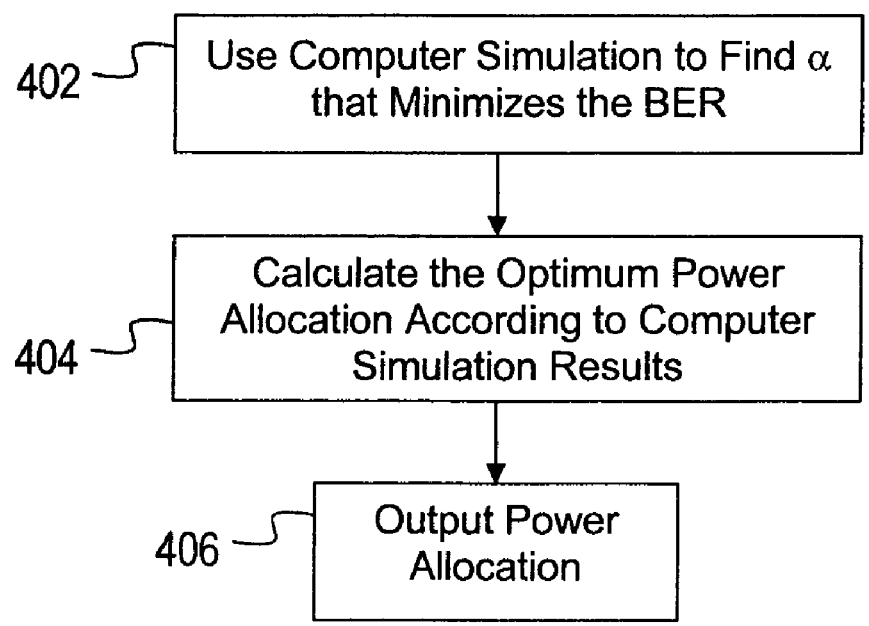
FIG. 4 shows one embodiment of a process for determining power allocation for a MIMO system.

First, a 2-input and M-output MIMO system is considered. The 2-input and M-output MIMO system contains two antennas 110 at the transmitter 100 and any number, M, of antennas 202 at the receiver 200. FIG. 4 depicts a method to find the optimum power allocation in the 2-input and M-output MIMO system. In accordance with equation (19) above, the BER of the 2-input and M-output MIMO system can be expressed as:

$$P_b = g(\gamma; \lambda_1, \lambda_2). \quad (20)$$

Since the total amount of power to be allocated is express in equation (18), then equation (18) may be solved for K=2 since there are two antennas 110 in this MIMO system. A ratio of the power allocated to the first antenna to the power allocated to the second antenna may be defined as $$\alpha = \frac{\lambda_1^2}{\lambda_2^2}.$$

In accordance with this relation, then equation (18) may be solved such that:

$$\lambda_1 = \sqrt{\frac{2\alpha}{1+\alpha}} \text{ and, } \lambda_2 = \sqrt{\frac{2}{1+\alpha}}. \quad (21)$$

Inserting these solutions into equation (20) the BER of the 2-input and M-output MIMO system can be expressed as:

$$P_b = g\left(\gamma; \sqrt{\frac{2\alpha}{1+\alpha}}, \sqrt{\frac{2}{1+\alpha}}\right). \quad (22)$$

In block 402, computer simulation may be performed to find $\alpha$ in (22) that minimizes the BER for any given SNR. This computer simulation may be performed by the power allocation calculator 112 of the transmitter 100 or performed by another computer and input to be stored by the power allocation calculator 112, for example. As such, $\alpha$ is calculated to be some function of the SNR of the MIMO system, expressed as:

$$\alpha = f_2(\gamma). \quad (23)$$

In block 404, the optimum $\alpha$ of equation (23) is substituted into equation (21) to calculate the optimum power allocation for the MIMO system. As such the power is allocated in accordance with a function of the SNR of the 2-input and M-output MIMO system, which may be expressed as:

$$\lambda_1(\gamma, 2) = \sqrt{\frac{2 f_2(\gamma)}{1 + f_2(\gamma)}}, \quad (24)$$

and $$\lambda_2(\gamma, 2) = \sqrt{\frac{2}{1 + f_2(\gamma)}}. \quad (25)$$

At block 406, the results of equations (24) and (25) are output by the power allocation calculator 112 to the adjustors 108.

Figure 8A:
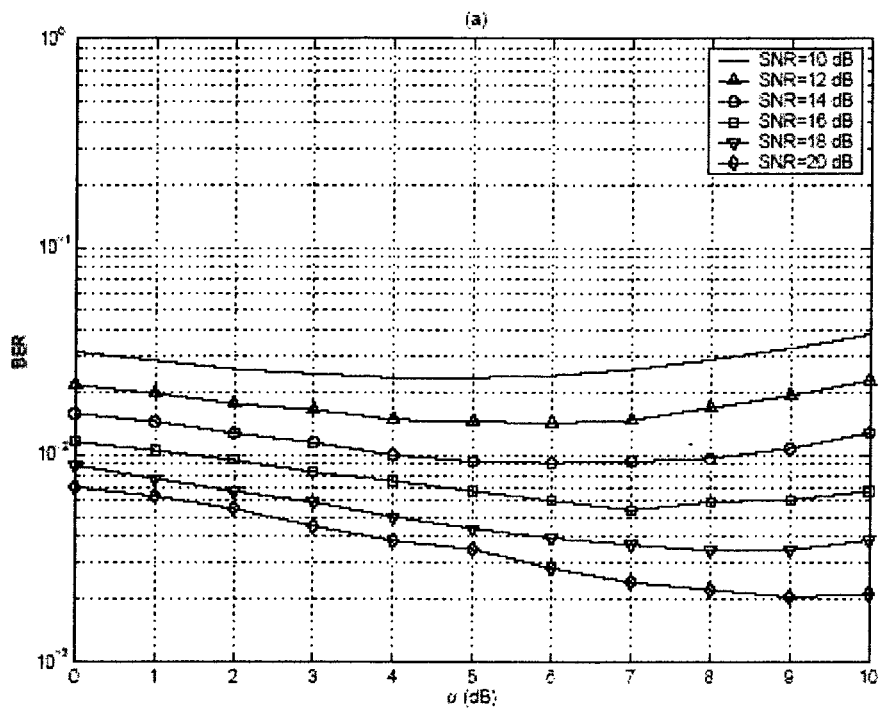
FIGS. 8A and 8B shows illustrative performance results of a 2-input and 2-output MIMO system.

In order to better understand the calculation of $\alpha$, some exemplary results of block 402 are shown in FIG. 8A. FIG. 8A illustrates exemplary performance of a 2-input and 2-output MIMO system in terms of the BER versus $\alpha$ for different SNR's. From the results shown in FIG. 8A, a relationship between $\alpha$ and SNR that minimizes the BER of the 2-input and 2-output MIMO system can be obtained. In this case it can be seen that $\alpha$ is as follows:

$$\alpha = f_2(\gamma) = \begin{cases} \text{about 5 dB,} & \text{if } \gamma \langle \text{ about 11 dB,} \\ \text{about 6 dB,} & \text{if about 11} \le \gamma \langle \text{ about 15 dB,} \\ \text{about 7 dB,} & \text{if about 15} \le \gamma \langle \text{ about 17 dB,} \\ \text{about 8 dB,} & \text{if about 17} \le \gamma \langle \text{ about 19 dB,} \\ \text{about 10 dB,} & \text{if } \gamma \ge \text{ about 19 dB.} \end{cases}$$

Figure 5:
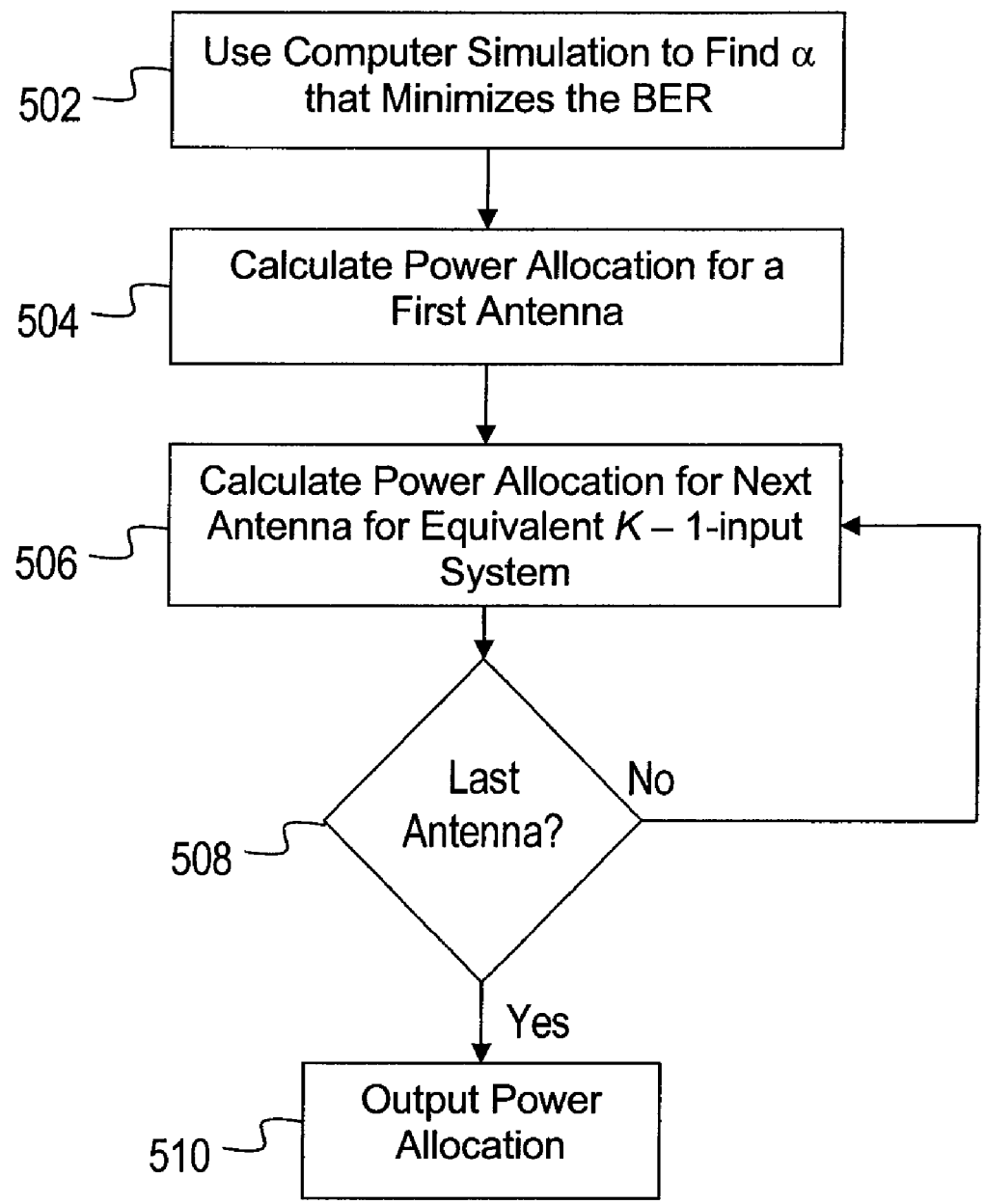
FIG. 5 shows another embodiment of a process for determining power allocation in MIMO systems.

When the SNR of a MIMO system is known, the optimum power allocation for a MIMO system with any number of transmit antennas can be obtained iteratively using the process shown in FIG. 5. Assuming that the optimum power allocation for a K−1-input and M-output system is known, the optimum power allocation for a K-input and M-output system can be obtained as follows. Similar as before, a ratio of the power allocated to the first antenna to the average power allocated to the rest of the antennas is defined as $\alpha$, which may be expressed as:

$$\alpha = \frac{\lambda_1^2}{\frac{1}{K-1} \sum_{i=2}^{K} \lambda_i^2}. \quad (26)$$

In accordance with the relation in equation (26), then equation (18) may be solved such that the power allocated to the first antenna is expressed as:

$$\lambda_1^2 = \frac{K\alpha}{K - 1 + \alpha}, \quad (27)$$

and the power allocated to the rest of the antennas is expressed as:

$$\frac{1}{K-1} \sum_{i=2}^{K} \lambda_i^2 = \frac{K}{K - 1 + \alpha}. \quad (28)$$

As noted in the discussion above on DF detection, once the first signal is detected, its impact can be cancelled from the received signal vector. The remaining signal vector is equivalent to a signal vector that would be transmitted by a K−1-input and M-output MIMO system. Therefore, the power should be allocated such that $\lambda_2, \ldots \lambda_K$ of the K-input and M-output MIMO system is allocated according to a power allocation $\lambda_1(\gamma, K-1), \ldots, \lambda_{K-1}(\gamma, K-1)$ that optimizes the equivalent K−1-input and M-output MIMO system. The SNR for the equivalent system is $$\frac{K}{K - 1 + \alpha}\gamma$$

if the original SNR of the K-input and M-output system is $\gamma$. Therefore, in accordance with equation (28) the power allocated to each of the second and following antennas may be expressed as:

$$\lambda_i = \sqrt{\frac{K}{K - 1 + \alpha}} \lambda_{i-1}\left(\frac{K}{K - 1 + \alpha}\gamma, K - 1\right) \quad (29)$$

for i=2, ..., K. In accordance with equations (19), (27), and (29), the BER for the K-input and M-output MIMO system can be expressed as:

$$P_b = g\left(\gamma; \sqrt{\frac{K\alpha}{K - 1 + \alpha}}, \sqrt{\frac{K}{K - 1 + \alpha}} \lambda_1\left(\frac{K}{K - 1 + \alpha}\gamma, K - 1\right), \quad (30)\right.$$
$$\left. \ldots, \sqrt{\frac{K}{K - 1 + \alpha}} \lambda_{K-1}\left(\frac{K}{K - 1 + \alpha}\gamma, K - 1\right)\right),$$

which is a function of the SNR, $\gamma$, of the K-input and M-output MIMO system and of $\alpha$ as defined above in equation (26). Similar to above, in block 502 a computer simulation may be performed to find $\alpha$ in (30) that minimizes the BER for any given SNR. As such, $\alpha$ is calculated to be some function of the SNR of the K-input and M-output MIMO system, expressed as:

$$\alpha = f_K(\gamma). \quad (31)$$

In block 504, substituting (31) into (27) the optimum power allocation for a first antenna may be expressed as:

$$\lambda_1^2 = \frac{K f_k(\gamma)}{K - 1 + f_K(\gamma)}. \quad (32)$$

In blocks 506 and 508 the optimum power allocation for the second and following antennas may be iteratively obtained by $$\lambda_i = \sqrt{\frac{K}{K - 1 + f_K(\gamma)}} \lambda_{i-1} \left( \frac{K}{K - 1 + f_K(\gamma)} \gamma, K - 1 \right) \quad (33)$$

for i=2, . . . , K for the equivalent K−1-input and M-output system. In block 510 the power allocation calculator 112 may output the power allocation factors to the adjustors 108. In accordance with the description above, the power allocation for a 3-input MIMO system requires that the power allocation for a 2-input system is known. As such, the power allocation for MIMO systems with a successively larger number of transmit antennas 110 must be iteratively calculated.

Figure 6:
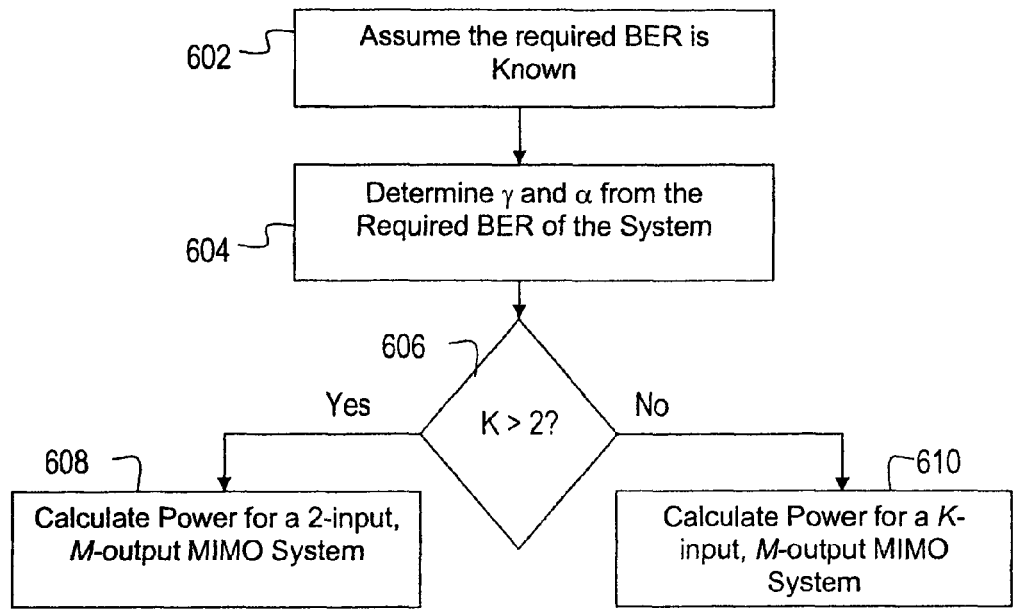
FIG. 6 shows an illustrative process to determine optimum power allocation based on a required bit-error rate of the MIMO system.

The above discussion on finding optimum power allocation for a MIMO system was for the case when the SNR was known at the transmitter 100. However, the transmitter 100 sometimes may not know the SNR. As stated above, the determination of α for various MIMO systems may be calculated off-line ahead of time and stored at the power allocation calculator 112. In this case, α may be selected to minimize the required BER of the system using the process shown in FIG. 6 based on the stored calculations of α and the required BER of the MIMO system. At block 602 it is assumed that the required BER of the system is known. In block 604, using the results stored in the power allocation calculator 112, α may be selected to minimize the required BER. For example, the results of the calculation for α in a 2-input and 2-output MIMO system shown in FIG. 8A may be stored at the power allocation calculator 112. In the example of FIG. 8A, if the required BER of the system is 1%, then the SNR may be found to be in the range between 11-15 dB, and therefore α=6 dB. In block 606, it is determined whether the number of transmitter antennas 110, K, is greater than two. If the number of transmitter antennas 110 is not greater than two, then the process proceeds to calculate the power allocation for a 2-input and M-output MIMO system. When calculating the power allocation for a 2-input and M-output MIMO system in accordance with FIG. 4, the process may begin at block 404 because α has already been determined in block 604. Returning to block 606, if the number of transmitter antennas 110 is greater than two, then the process proceeds to calculate the power allocation for a K-input and M-output MIMO system. When calculating the power allocation for a K-input and M-output MIMO system in accordance with FIG. 5, the process may begin at block 504 because α has already been determined in block 604.

Figure 7:
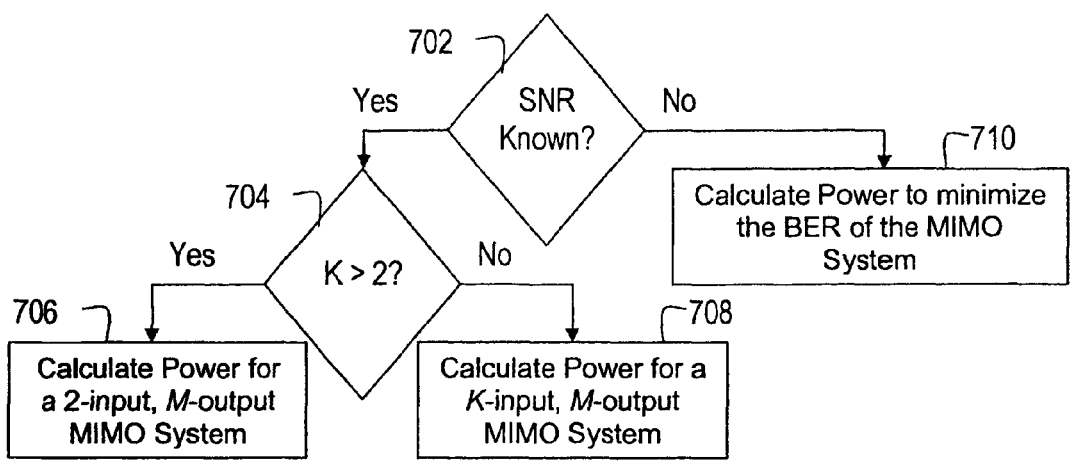
FIG. 7 shows another embodiment of a process for determining power allocation in MIMO systems.

FIG. 7 describes the overall process that the power allocation calculation unit may perform in an embodiment. In block 702, it is determined if the SNR of the MIMO system is known. If the SNR is not known, then in block 710 the power allocation is calculated to minimize the required BER of the MIMO system, for example, using the process illustrated in FIG. 6. Returning to block 702, if the SNR is known, then in block 704 it is determined whether the number of transmitter antennas 110, K, is greater than two. If the number of transmitter antennas 110 is not greater than two, then in block 706 the power allocation is calculated for a 2-input and M-output MIMO system in accordance with FIG. 4. If the number of transmitter antennas 110 is greater than two, then in block 708 the power allocation is calculated for a K-input and M-output MIMO system in accordance with FIG. 5.

For MIMO systems with error-correct coding, the redundancy in the code can be used to further improve the performance. Each of the sub-streams, $b_k[n]$, may be encoded separately by channel encoders 104. At the receiver 200, each of the decisions may be decoded and demodulated by the demodulator and decoder 208 to produce decoded words, $\hat{b}_k[n]$. The decoded words may then be re-encoded and re-modulated at the receiver to more reliably detect the transmitted signal, $d_k[n]$ using the error correcting code. This error correction may be used in any of the processes described above, except in blocks 402 or 502, where the computer simulations are performed to minimize the word-error rate (WER) instead of the BER. Further, as shown by the dashed line in FIG. 2, instead of feeding back the decisions $\hat{d}_k[n]$ to the spatial temporal processor 204, the demodulated and decoded words $\hat{b}_k[n]$ may be fed back to the spatial temporal processor 204.

EXAMPLES

The examples shown in FIGS. 8A, 9A, 10A, and 11A demonstrate the simulation results to find α for various MIMO systems. FIGS. 8B, 9B, 10B, and 11B demonstrate the performance of the various MIMO systems when the SNR is known, when the SNR is not known, and when power is uniformly allocated to each of the signals. In the simulations, channel gains corresponding to different pairs of transmit and receive antennas, $h_{km}$'s, may be independent, complex Gaussian functions with zero mean and unit variance. In this instance, the lower-case "k" is a general designation of a transmitter antenna 110 and lower-case "m" is a general designation of a receiver antenna 202. The transmitted signals, $d_k[n]$'s, may be independent for different k's or n's and may be randomly drawn from 4-QAM constellations, $$\left\{ \pm \frac{1}{\sqrt{2}} \pm j \frac{1}{\sqrt{2}} \right\},$$

each with the same probability.

Figure 8B:
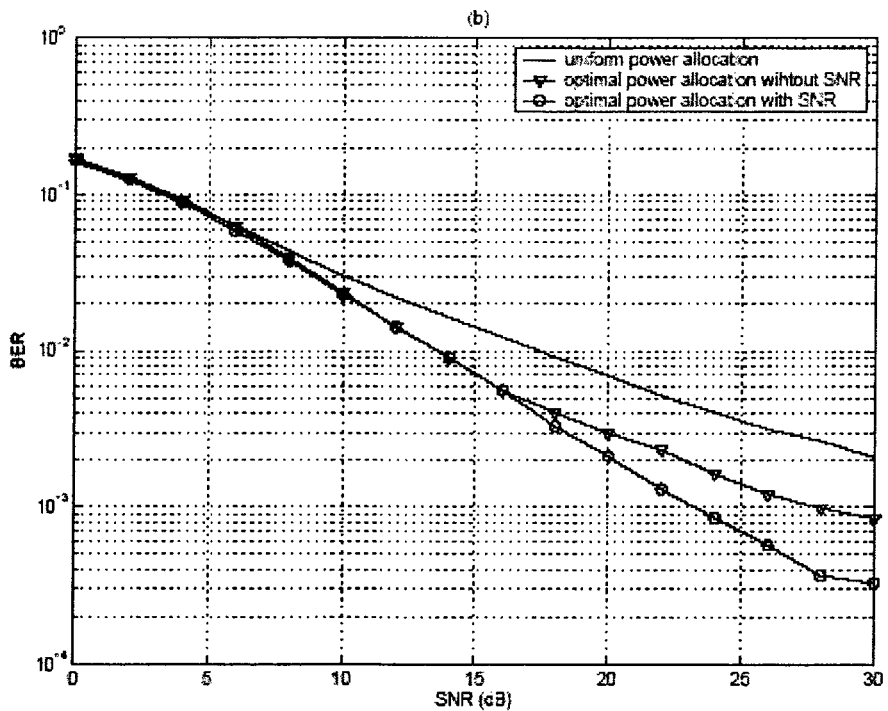

FIGS. 8A and 8B show the performance of a 2-input and 2-output MIMO system. FIG. 8A demonstrates the simulated BER versus α for different SNR's. As described above, the results of FIG. 8A may be used to obtain the relationship between α and the SNR that minimizes the BER of the 2-input and 2-output MIMO system.

FIG. 8B compares the performance of the 2-input and 2-output MIMO system when the SNR is known, when the SNR is not known, and when power is uniformly allocated to each of the signals. As shown in FIG. 8B, it can be seen that there is about a 4 dB performance gain at about 1% BER for the MIMO system with power allocation as compared to the MIMO system with uniform power allocation. Further, there is little performance difference for the power allocation when the SNR is less than about 12 dB, regardless of whether the SNR is known. When the SNR is known, and the SNR is larger than about 14 dB, the performance of the MIMO system is better than when the SNR is not known.

Figure 9A:
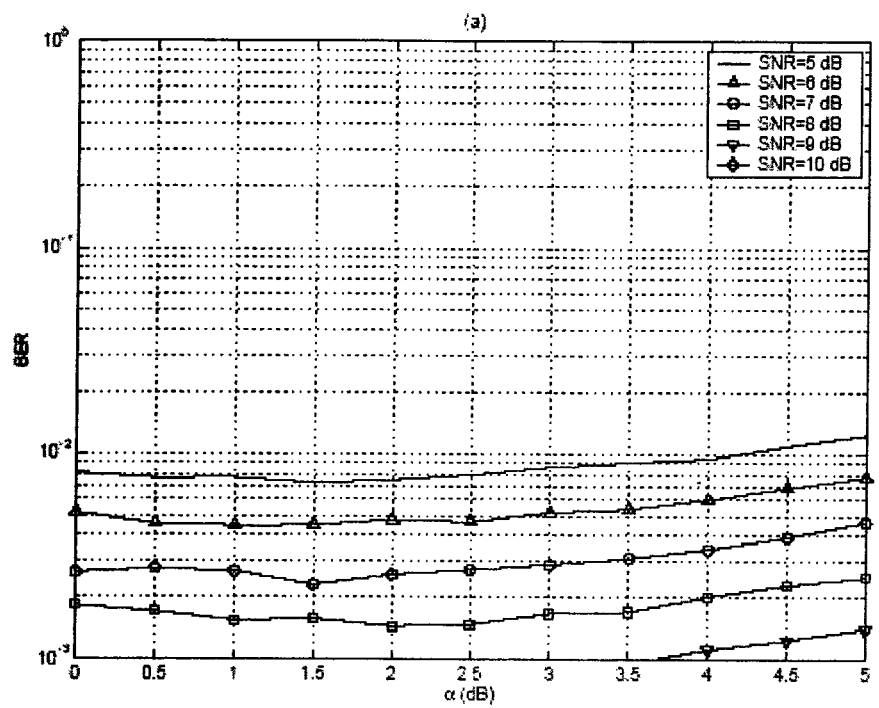
FIGS. 9A and 9B shows illustrative performance results of a 2-input and 4-output MIMO system.
Figure 9B:
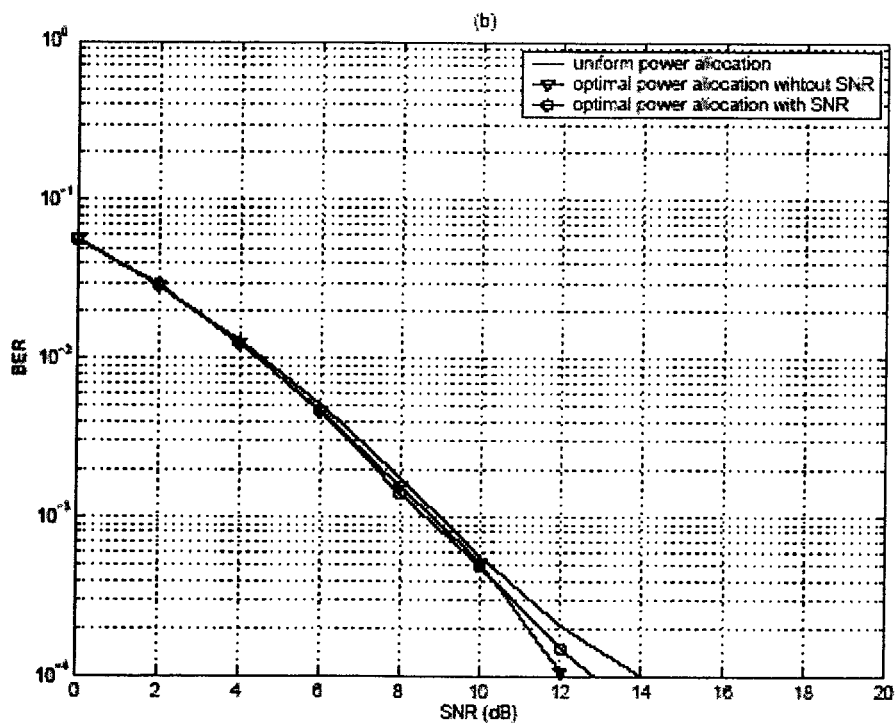

FIGS. 9A and 9B demonstrate the performance of a 2-input and 4-output MIMO system. Similar to FIGS. 8A and 8B, α is first found from FIG. 9A. FIG. 9B compares the performance of the MIMO system when the SNR is known, when the SNR is not known, and when power is uniformly allocated to each of the signals. From the FIG. 9B, it can be seen that when the SNR of the system is less than 10 dB there is little performance difference for the power allocation whether the SNR is known or not. When the SNR is known, and the SNR is larger than 12 dB, the performance of the MIMO system is better than when the SNR is not known.

Figure 10A:
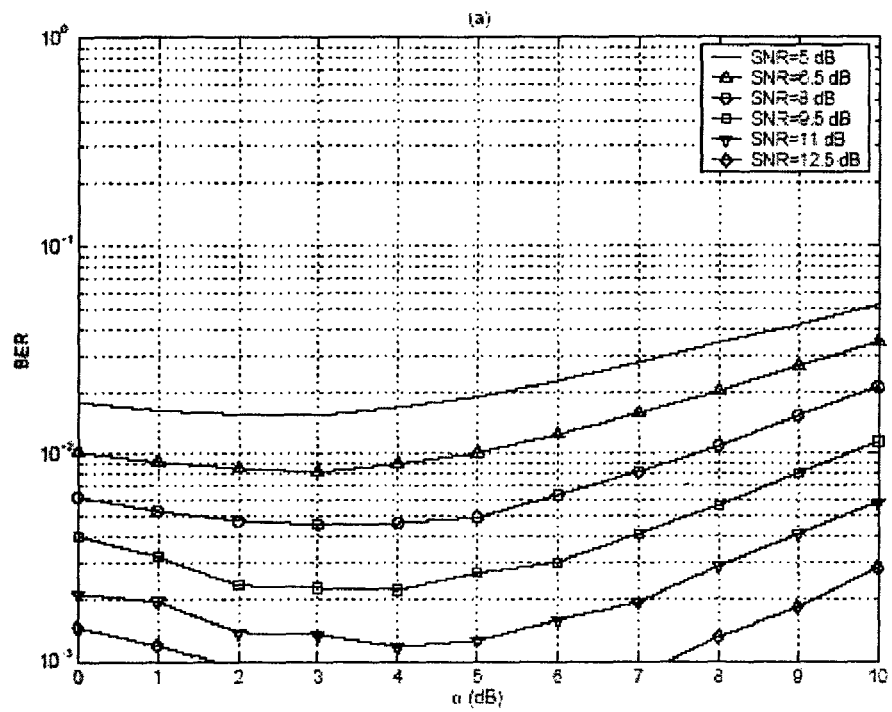
FIGS. 10A and 10B shows illustrative performance results of a 3-input and 4-output MIMO system.
Figure 10B:
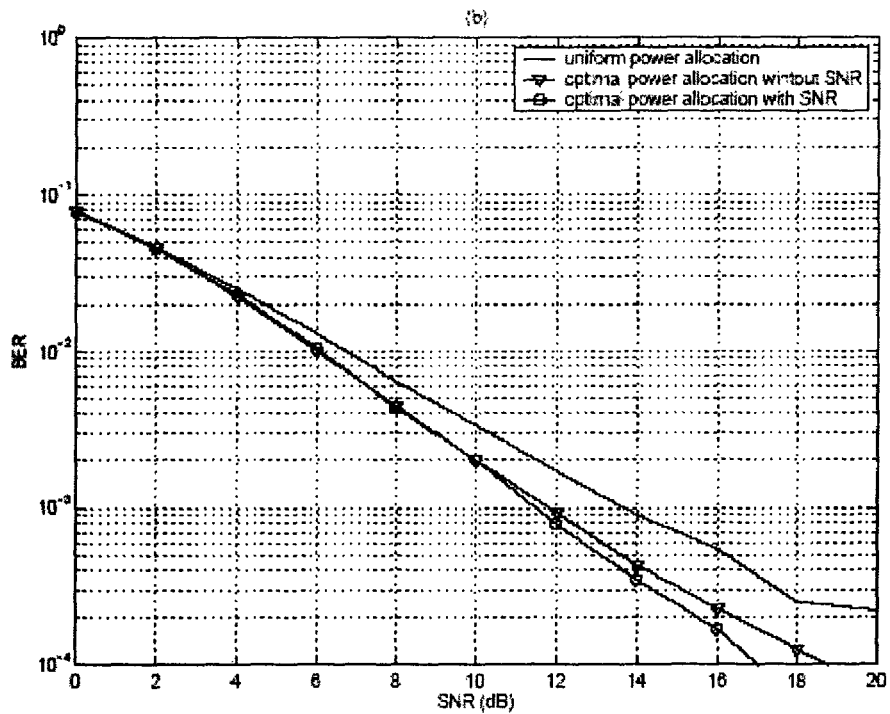

FIGS. 10A and 10B demonstrate the performance of a 3-input and 4-output MIMO system. From FIG. 10A, $\alpha=f_3(\gamma)$ can be obtained. Based on $\alpha=f_2(\gamma)$ found in FIG. 9A and $\alpha=f_3(\gamma)$, power may be allocated for each of the signals at the transmitter 100. FIG. 10B compares the performance of the 3-input and 4-output MIMO system when the SNR is known, when the SNR is not known, and when power is uniformly allocated to each of the signals. From the FIG. 10B, it can be seen that there is a performance gain of 0.6 dB SNR at 1% BER and about a 2 dB SNR performance gain at 0.1% BER.

Figure 11A:
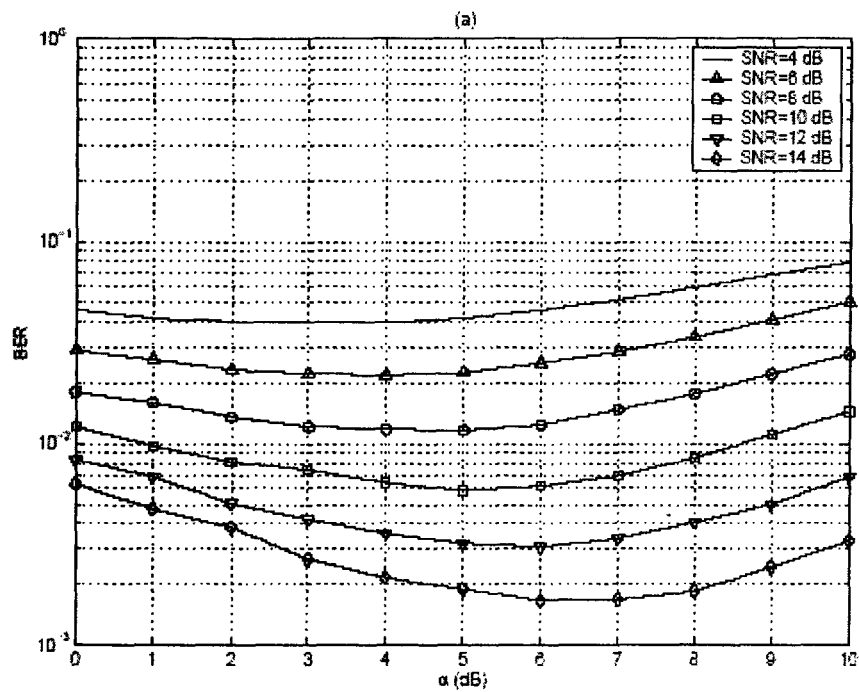
FIGS. 11A and 11B shows illustrative performance results of a 4-input and 4-output MIMO system.
Figure 11B:
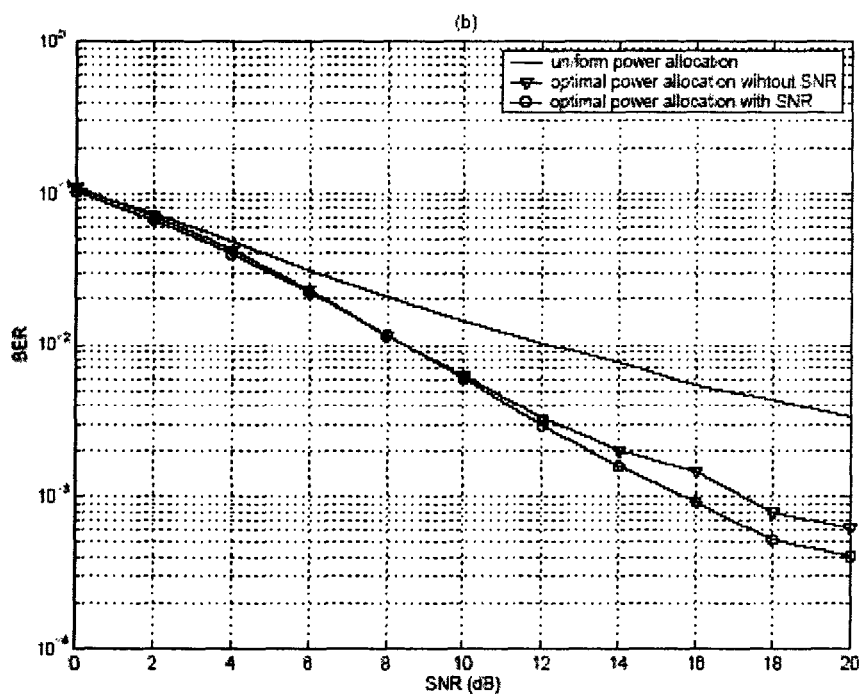

FIGS. 11A and 11B demonstrate the performance of a 4-input and 4-output MIMO system. From FIG. 11A, $\alpha=f_4(\gamma)$ can be obtained. Based on $\alpha=f_2(\gamma)$ found in FIG. 9A, $\alpha=f_3(\gamma)$ found in FIG. 10A, and $\alpha=f_4(\gamma)$, the power may be allocated for each of the signals at the transmitter 100. From FIG. 11B, it can be see that at 1% BER the performance gain of the MIMO system may be as large as 3.5 dB where the performance gain continues to increases with the SNR of the system.

Disclosed above is an optimal power allocation method that may be used regardless of whether the MIMO system SNR is known. In particular, an experimental method to find the optimal power allocation in layered space-time coding MIMO system is disclosed. Computer simulation results show that optimal power allocation can improve the performance of a 2-input and 2-output system by 4 dB at 1% BER and that of a 4-input and 4-output system by 3.5 dB.

Also disclose above is a system and method for improving MIMO system performance without using CSI. This improved performance is gained through determining an optimal power allocation of the transmitted signals based on the SNR of the MIMO system. The power is allocated such that DF detection is improved by allocating more power to the first signals. By allocating power in this way, it was seen that the bit-error rate for a given signal-to-noise ratio is decreased compared to when power is allocated uniformly for all of the signals. The system and method disclosed above may also be used even if the SNR is not available at the transmitter. In the case of the SNR not being available, the power allocation is performed based on a required BER of the MIMO system. In this case, the performance is improved when compared to uniform power allocation, but may be less of an improvement than when the SNR is known. Also, error correcting code may be used at the receiver to further increase the performance gains.

Figure 12:
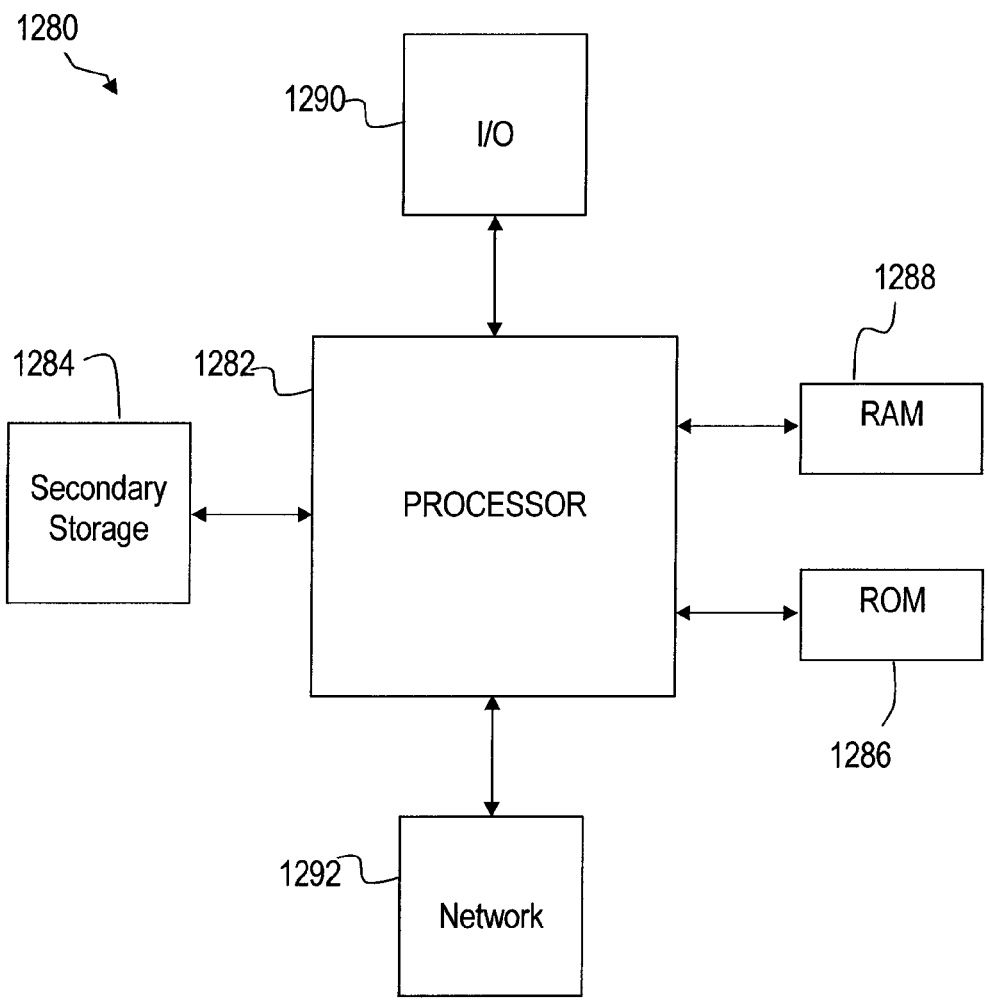
FIG. 12 illustrates an exemplary general purpose computer system suitable for implementing the several embodiments of the disclosure.

The power allocation calculator 112 and/or all of the other telecommunication network components in the system described above may be implemented on any general-purpose computer with sufficient processing power, memory resources, and network throughput capability to handle the necessary workload placed upon it. FIG. 12 illustrates a typical, general-purpose computer system suitable for implementing one or more embodiments disclosed herein. The computer system 1280 includes a processor 1282 (which may be referred to as a central processor unit or CPU) that is in communication with memory devices including secondary storage 1284, read only memory (ROM) 1286, random access memory (RAM) 1288, input/output (I/O) 1290 devices, and network connectivity devices 1292. The processor may be implemented as one or more CPU chips.

The secondary storage 1284 is typically comprised of one or more disk drives or tape drives and is used for non-volatile storage of data and as an over-flow data storage device if RAM 1288 is not large enough to hold all working data. Secondary storage 1284 may be used to store programs which are loaded into RAM 1288 when such programs are selected for execution. The ROM 1286 is used to store instructions and perhaps data which are read during program execution. ROM 1286 is a non-volatile memory device which typically has a small memory capacity relative to the larger memory capacity of secondary storage. The RAM 1288 is used to store volatile data and perhaps to store instructions. Access to both ROM 1286 and RAM 1288 is typically faster than to secondary storage 1284.

I/O 1290 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 1292 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 1292 may enable the processor 1282 to communicate with an Internet or one or more intranets. With such a network connection, it is contemplated that the processor 1282 might receive information from the network, or might output information to the network in the course of performing the above-described method steps. Such information, which is often represented as a sequence of instructions to be executed using processor 1282, may be received from and outputted to the network, for example, in the form of a computer data signal embodied in a carrier wave Such information, which may include data or instructions to be executed using processor 1282 for example, may be received from and outputted to the network, for example, in the form of a computer data baseband signal or signal embodied in a carrier wave. The baseband signal or signal embodied in the carrier wave generated by the network connectivity devices 1292 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 1282 executes instructions, codes, computer programs, scripts which it accesses from hard disk, floppy disk, optical disk (these various disk based systems may all be considered secondary storage 1284), ROM 1286, RAM 1288, or the network connectivity devices 1292.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A telecommunication network component, comprising:
a memory configured to store instructions; and
a processor configured to execute the stored instructions, the instructions comprising:
  determining a plurality of power allocation adjustments for signals transmitted via an antenna array that promotes decision-feedback detection without using channel state information, determining the power allocation adjustments comprises
    determining a ratio of adjustments between a first antenna in the array and the remaining antennas in the array that reduces a bit-error rate for a signal-to-noise ratio, and
    calculating an adjustment for the first antenna in accordance with the ratio of adjustments and the signal-to-noise ratio, and
  outputting the power allocation adjustments to the array.

2. The telecommunication network component of claim 1, wherein the signal-to-noise ratio is determined based on a required bit-error rate.

3. The telecommunication network component of claim 1, wherein calculating the adjustment for the first antenna is performed in accordance with:

$$\lambda_1^2 = \frac{K\alpha}{K-1+\alpha},$$

where $\lambda_1$ is the adjustment for the first antenna, $\alpha$ is the ratio of adjustments, and K is the number of antennas in the array.

4. The telecommunication network component of claim 1, wherein determining the power allocation adjustments further comprises:
iteratively calculating one less than the plurality of adjustments for the remaining antennas in the array based on a power allocation of an equivalent system.

5. The telecommunication network component of claim 4, wherein iteratively calculating one less than the plurality of adjustments for the remaining antennas is performed in accordance with:

$$\lambda_i = \sqrt{\frac{K}{K-1+\alpha}} \lambda_{i-1}\left(\frac{K}{K-1+\alpha}\gamma, K-1\right),$$

where $\lambda_i$ is the adjustment for one of the remaining antennas, $\lambda_{i-1}$ is the adjustment for the previous antenna in the equivalent system, k is the number of antennas in the array, and $\alpha$ is the ratio of adjustments.

6. A power allocation method comprising:
determining a power allocation scheme that promotes decision-feedback detection in a multiple-input and multiple-output system without using channel state information;
wherein determining the power allocation scheme comprises
  determining a ratio of adjustments to each antenna in an antenna array that minimizes a bit-error rate for a signal-to-noise ratio, and
  calculating adjustments for each antenna in the antenna array based on the ratio of adjustments determined for the signal-to-noise ratio; and
  implementing the power allocation scheme on an antenna array by modifying an adjustment for each of a plurality of antennas in the array.

7. The power allocation method of claim 6, wherein the antenna array comprises a first antenna and a second antenna.

8. The power allocation method of claim 7, wherein calculating the power allocation scheme for the antenna array is in accordance with:

$$\lambda_1 = \sqrt{\frac{2\alpha}{1+\alpha}}, \text{ and } \lambda_2 = \sqrt{\frac{2}{1+\alpha}},$$

where $\lambda_1$ is the adjustment for the first antenna, $\lambda_2$ is the adjustment for the second antenna, and $\alpha$ is the determined ratio.

9. The power allocation method of claim 6, wherein the method for determining the power allocation further comprises:
determining the signal-to-noise ratio of the array based on a required bit-error rate of the array.

10. The power allocation method of claim 6, wherein power allocation scheme further improves successive interference cancellation in the multiple-input and multiple-output system.

11. A system for communicating modulated signals comprising:
an array of antennas configured to transmit modulated signals;
at least one adjustment unit configured to adjust power allocated to the antennas; and
a calculation unit configured to calculate at least one adjustment for the at least one adjustment unit to improve decision-feedback detection at an array of receivers without using channel state information, wherein the calculation unit determines a ratio of adjustments between a first antenna in the array and the remaining antennas in the array that minimize a bit-error rate for a signal-to-noise ratio, and wherein the calculation unit determines an adjustment for the first antenna based on a ratio of adjustments determined for the signal-to-noise ratio.

12. The system of claim 11, wherein the decision-feedback detection is improved by allocating an amount of power to a first antenna in the array and successively smaller amounts of power to subsequent antennas in the array.

13. The system of claim 11, further comprising:
an array of antennas configured to receive signals; and
one or more units configured to detect a signal in the received signals by suppressing interference using a nulling vector.

14. The system of claim 13, wherein the one or more units are further configured to suppress interference by canceling out previously detected symbols.

15. The system of claim 13, wherein the one or more units are further configured to detect the signal using error correcting code.

16. The power allocation method of claim 6, wherein the antenna array is a two-antenna array.

* * * * *